United States Patent
Correas-Serrano et al.

(10) Patent No.: US 11,916,604 B2
(45) Date of Patent: Feb. 27, 2024

(54) DISPERSION COMPENSATION FOR ELECTROMAGNETIC WAVEGUIDES

(71) Applicant: Intel Corporation, Santa Clara, CA (US)

(72) Inventors: Diego Correas-Serrano, Tempe, AZ (US); Georgios Dogiamis, Chandler, AZ (US); Henning Braunisch, Phoenix, AZ (US); Neelam Prabhu Gaunkar, Chandler, AZ (US); Telesphor Kamgaing, Chandler, AZ (US); Thomas W. Brown, Portland, OR (US); Stefano Pellerano, Beaverton, OR (US)

(73) Assignee: Intel Corporation

( * ) Notice: Subject to any disclaimer, the term of this patent is extended or adjusted under 35 U.S.C. 154(b) by 754 days.

(21) Appl. No.: 16/893,660

(22) Filed: Jun. 5, 2020

(65) Prior Publication Data

US 2020/0304215 A1  Sep. 24, 2020

(51) Int. Cl.
*H03H 7/30* (2006.01)
*H04B 15/00* (2006.01)
*H04L 25/03* (2006.01)

(52) U.S. Cl.
CPC ............ *H04B 15/00* (2013.01); *H04L 25/03* (2013.01)

(58) Field of Classification Search
CPC ............................... H04B 15/00; H04L 25/03
USPC ................... 375/229, 219, 295, 316
See application file for complete search history.

(56) References Cited

U.S. PATENT DOCUMENTS

| | | | | |
|---|---|---|---|---|
| 6,973,297 | B1* | 12/2005 | Manku | H04B 1/30 455/318 |
| 2003/0215028 | A1* | 11/2003 | Hammes | H04L 27/1525 375/316 |
| 2006/0034366 | A1* | 2/2006 | Schmidt | H04L 27/0008 375/239 |
| 2012/0281550 | A1* | 11/2012 | Huang | H04B 1/0475 370/249 |
| 2013/0064148 | A1* | 3/2013 | Boo | H04L 27/2092 370/281 |
| 2019/0115951 | A1 | 4/2019 | Braunisch et al. | |

OTHER PUBLICATIONS

Ahmadi, et al "A New Second-Order All-PAss Filter in 130-nm CMOS", IEEE Transactions on Circuits and Systems—II: Express Briefs, vol. 63, No. 3, Mar. 2016, pp. 249-353.
Gupta, et al "Group-Delay Engineered Noncommensurate Transmission Line All-Pass Network for Analog Signal Processing", IEEE Transactions on Microwave Theory and Techniques, vol. 58, No. 9, Sep. 2010, pp. 2392-2407.
Kumar, et al "Design and Implementation of High Frequency and Large Group Delay Bridged-T All Pass Network," Proceedings of the 48th European Microwave Conference, EuMA, Oct. 1-3, 2019, Paris, France, pp. 376-379.

* cited by examiner

*Primary Examiner* — Zewdu A Kassa
(74) *Attorney, Agent, or Firm* — Akona IP PC

(57) ABSTRACT

Embodiments may relate to a communications module comprising with a dispersion compensation module communicatively coupled between a baseband module and a radio frequency (RF) module. The dispersion compensation module may be configured to process a data signal at an intermediate frequency that is between a baseband frequency and a RF frequency. Other embodiments may be described or claimed.

20 Claims, 7 Drawing Sheets

DISPERSION COMPENSATION FOR ELECTROMAGNETIC WAVEGUIDES

BACKGROUND

As more devices become interconnected, and users consume more data, the demand on servers to supply that data has increased. Among other issues, these demands may include increased data rates, switching architectures with longer interconnects, interconnects with low raw bit-error-rates, interconnects with relatively low latency, lower cost, or lower-power solutions.

DETAILED DESCRIPTION

Figure 1:
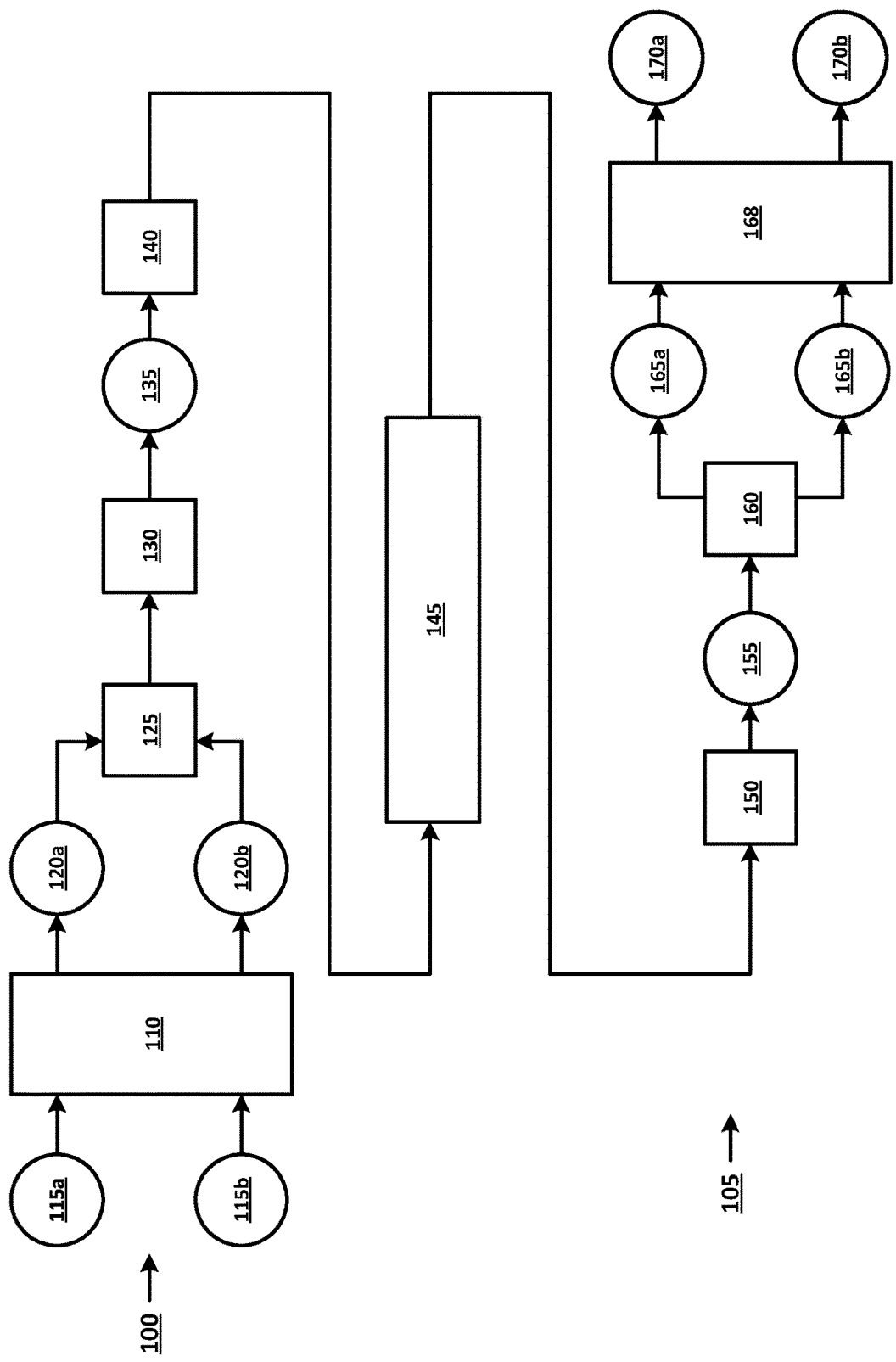
FIG. 1 depicts an example architecture that includes dispersion compensation, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an application-specific integrated circuit (ASIC), an electronic circuit, a processor (shared, dedicated, or group) or memory (shared, dedicated, or group) that execute one or more software or firmware programs, a combinational logic circuit, or other suitable components that provide the described functionality.

As noted, demand for increased server performance may create various interconnect-related demands. For medium range (e.g., between approximately 1 and approximately 5 meter (m) long) transmission in servers or high-performance computers, dielectric waveguides operating in the millimeter-wave (mmWave), sub-terahertz (THz), or greater, frequency range may be capable of providing performance or cost advantages versus optical or electrical interconnect fabrics. As used herein, mmWave may refer to electromagnetic signals with a frequency between approximately 30 gigahertz (GHz) and approximately 300 GHz. Sub-THz may refer to electromagnetic signals with a frequency between approximately 300 GHz and approximately 1 THz. Generally, embodiments herein may relate to communications systems that propagate electromagnetic signals with a frequency greater than approximately 30 GHz along a waveguide.

The desired data rate at mmWave frequencies or above may be achieved by taking advantage of the available frequency bandwidth. For example, a radio or transceiver operating over a 40 GHz bandwidth from approximately 100 GHz to approximately 140 GHz may deliver data rates of up to 56 gigabits per second (Gbps) with a quadrature phase-shift keying (QPSK) modulation scheme. The same radio may deliver over 100 Gbps over the same frequency range if a quadrature amplitude modulation-16 (QAM16) modulation scheme is used. In radio-over-waveguide applications, a waveguide operating over a broad frequency range may experience significantly different group-delay response as a function of the frequency over medium to long transmission ranges (e.g., between approximately 1 and approximately 10 m). This chromatic dispersion may inherently result in intersymbol interference (ISI) as digital signals carried on different wavelengths may travel at different speeds on the same waveguide.

More specifically, embodiments herein may relate to intermediate-frequency (IF) dispersion compensation (DC) architecture for medium-long reach (e.g., approximately 1-5 m long) mmWave or above waveguide channels. The DC may be based on cascaded low-order allpass filters (APFs) with a resonant group-delay response. Embodiments of the DC herein may operate at an IF that is lower than the waveguide channel frequency, which may enable low-loss, accurate filters, and efficient re-amplification if needed. Embodiments herein may further equalize an in-phase (I) and a quadrature (Q) channel, which may typically be viewed as a 4-port system, using a single 2-port analog circuit.

Embodiments may provide a number of advantages. One such advantage may be that the I/Q channel may be equalized using a single 2-port circuit. In legacy systems, at baseband, equalization may have required four 2-port circuits to implement a 2×2 transfer matrix. Therefore, embodiments may allow for simplified and cost-efficient manufacturing. Embodiments may also provide increased flexibility. Specifically, implementation of embodiments herein may be based on a cascade of APFs that allow compensation of channels with arbitrary dispersion. Embodiments may also allow for low-power, inherently wideband, negligible latency interconnects and are independent on the employed modulation (e.g., pulse-amplitude modulation (PAM)4, PAM8, phase-shift keying (PSK)8, QPSK, QAM16, QAM64, etc.).

FIG. 1 depicts an embodiment that may include DC implemented at an IF. Specifically, FIG. 1 depicts an example architecture that includes DC, in accordance with various embodiments. Generally, it will be understood that FIG. 1, and other Figures herein, are intended as high-level examples for the purpose of illustrating and discussing various concepts of the present disclosure. Real-world embodiments may include more or fewer elements than are depicted in FIG. 1. For example, in some embodiments additional active or passive circuitry may be present, or certain elements such as various of the local oscillators may not be present. Other variations may be present in other embodiments.

Generally, FIG. 1 depicts a communication architecture which may include a transmit module 100 and a receive module 105 that are communicatively coupled by a waveguide 145. Although the transmit and receive modules 100/105 are discussed herein as communicating in a single direction, it will be understood that in other embodiments one or both of the transmit module 100 or receive module 105 may include elements, components, or circuitry that enable bidirectional communication with both transmit and receive functionality. That is, in other embodiments one or more of both the transmit or receive modules 100/105 may be referred to as a transceiver module.

The transmit module 100 may include a number of signal inputs 115a and 115b. The signal inputs 115a/115b may be configured to receive a signal from an active element of an electronic device of which the transmit module 100 is a part. Such an active element may be a processor such as a central processing unit (CPU), a graphics processing unit (GPU), a field programmable gate array (FPGA), a core of a multi-core processor, a memory, a serializer, or some other element of the electronic device. In some embodiments, the signal inputs 115a/115b may be configured to receive the data signal from the same active element of the electronic device, while in other embodiments the signal input 115a may receive the data signal from a different active element than signal input 115b. In some embodiments, the data signal input to signal input 115a may be referred to as the in-phase or "I" signal, and the data signal input to signal input 115b may be referred to as the quadrature or "Q" signal (or vice-versa in other embodiments).

The data signals from the signal inputs 115a/115b may be input to a baseband module 110 which may be configured to perform baseband processing on the first and second data signals. Generally, the baseband processing may include amplification, attenuation, filtering, time delays for skewing/de-skewing, or some other form of pulse shaping performed by digital or analog circuits to improve signal integrity or deliver the right power levels to subsequent circuits. Baseband processing may further include serialization/deserialization circuitry and modulation-demodulation circuitry (modem). Typically, the baseband module 100 may be hardware, software, firmware, circuitry, logic, or some other component, element, or combination of elements which may be configured to perform the modulation function or other functions described herein.

The data signals may be input to mixers which may change the frequency of the data signals to an IF by multiplying it with local oscillators (LOs), as described above. The specific LOs are not depicted in the Figures herein for the sake of lack of clutter and redundancy of the Figure. In some embodiments, the LOs coupled with mixers 120a and 120b may be in quadrature (i.e., have a phase difference of approximately 90 degrees), which may allow the signals to be combined later by a combiner such as combiner 125 through addition without incurring loss of information.

Specifically, the data signals received at the signal inputs 115a/115b may have a frequency bandwidth that is referred to as a "baseband bandwidth," which may be on the order of between approximately 1 and approximately 50 GHz. Additionally, as described above, the electromagnetic signal sent through waveguide 145 may be a mmWave signal or higher with a frequency higher than approximately 30 GHz. The mixers 120a/120b may change the frequency of the data signal(s) to an IF that is between the baseband bandwidth and the frequency of the electromagnetic signal. In some embodiments, the IF may be on the order of 10-30 GHz. However, it will be understood that in other embodiments the IF may be higher or lower, dependent on factors such as the frequency of the electromagnetic signal within the waveguide 145 and the baseband bandwidth. At a high level, the frequency of the IF may be dependent on the bandwidth of the baseband signal, as well as the radio frequency (RF) module frequency. In some embodiments, the IF may be as low as approximately 10 GHz, while in other embodiments the IF may be greater than approximately 100 GHz for sub-THz applications where the RF is above 300 GHz. Generally, it will be desirable for the IF to be higher than the baseband bandwidth.

In terms of signal integrity, it is may be desirable for the IF to be much lower than the frequency of the electromagnetic signal because circuits may tend to present lower loss and therefore may be targeted more accurately. In the specific case of allpass filters, loss may be directly proportional to frequency for a given group-delay. For example, in some embodiments:

$$\text{Loss [dB]} = \frac{10}{\log(10)} \cdot \frac{2\pi \cdot \text{Delay}}{Q},$$

where Q is the overall intrinsic quality factor of the circuit. On the other hand, operating at lower frequency may imply larger passive components, potentially increasing cost and making integration more difficult. Such trade-offs may be evaluated for each application and system architecture.

The frequency-shifted data signals may then be output from the mixers 120a/120b to a combiner 125 which may combine the signals to form a combined I/Q signal as described above The combined I/Q signal may then be input to a DC module 130. The DC module 130 may be configured to mitigate dispersion of the electromagnetic signal as it propagates along the waveguide 145 in the mmWave or higher frequency. As may be described in greater detail with respect to FIGS. 5 and 6, the DC module 130 may be implemented as a series of cascaded or serially-connected APFs.

The signal may then be output from the DC module 130 to another mixer 135, where the signal may be upconverted to a frequency in the mmWave or greater range. The signal with the mmWave or greater frequency range may be provided to an RF module 140 which may be configured to amplify and filter the incoming mmWave signal. The RF module 140 may be hardware, software, firmware, circuitry, logic, or some other component, element, or combination of elements which may be configured to perform the modulation function or other functions described herein.

The RF module 140 may then facilitate transmission of the electromagnetic signal through a waveguide such as waveguide 145. The waveguide 145 may be, for example, a silicon waveguide, a metallic-clad dielectric waveguide, a dielectric-clad dielectric waveguide, a dielectric hollow or air-filled waveguide, or some other type of waveguide. In some embodiments, the waveguide 145 may be between approximately 2 and approximately 5 meters long, while in other embodiments the waveguide may be longer or shorter. It will be understood that although FIG. 1 (and other Figures herein) depict only a single RF module 140 of a single transmit module 100 communicatively coupled with the waveguide 145, in other embodiments a plurality of RF modules or a plurality of transmit module may be communicatively coupled with the waveguide 145.

The electromagnetic signal may be received from the waveguide 145 by a receive module 105, which may include a number of elements that are similar to those of the transmit module. Particularly, the receive module may include a RF module 150 which may be configured to amplify the received modulated electromagnetic signal to produce a recovered mmWave signal which is then output to a mixer 155 which may be configured to change (i.e., downconvert) the frequency of the signal to an IF. In some embodiments, the IF produced by mixer 155 may be the same as the IF produced by mixers 120a and 120b, that is, the transmit and receive modules 100/105 may have the same IF. In other embodiments, the transmit and receive modules 100/105 may have different IFs. The frequency-shifted signal may be provided to a splitter 160 which may separate the first data signal (e.g., the I signal) from the second data signal (e.g., the Q signal). The first and second data signals may be provided to mixers 165a/165b which may frequency-shift the signals to a baseband frequency that is similar to the baseband frequency described with respect to transmit module 100, and the first and second data signals (with the baseband frequencies) may be output to baseband module 168, which may be generally similar to baseband module 110. The baseband module 168 may be configured to perform equalization, serialization/deserialization, amplification, etc. The first and second data signals may then be output by the baseband module 168 to signal outputs 170a/170b. Specifically, signal outputs 170a/170b may be communicatively coupled with one or more elements of an electronic device of which the receive module 105 is a part such as a processor, a processor core, a memory, etc.

Generally, in embodiments, the presence of the DC module 130 may provide a number of advantages. For example, the DC module 130 may reduce or eliminate crosstalk between the I signal and the Q signal at the baseband module 110, compensate group-delay dispersion in the waveguide, etc. Embodiments may also allow for a relatively flat amplitude response in the mmWave electromagnetic signal at bandwidths up to approximately 10 GHz, which may be a significant increase in bandwidth compared to legacy architectures which may only exhibit a flat amplitude response in the mmWave electromagnetic signal up to approximately 4 GHz. More generally, embodiments herein may extend the useful baseband bandwidth y a factor ranging from approximately 2× to approximately 10×, depending on how many APFs may be included in the DC module 130 (as described in greater detail below). In some embodiments, it may be possible to use more APFs, or higher-order APFs, to compensate for more dispersion, enabling wider baseband bandwidths and, therefore, higher data rates.

Embodiments may further allow for compensated group-delay dispersion of the mmWave electromagnetic signal, which may result in relatively constant group-delay in bandwidths up to approximately 10 GHz. Additionally, in some embodiments, further baseband equalization may not be necessary. It will be understood that embodiments herein may further be scalable to different waveguides with different dispersion characteristics.

In embodiments herein it may be understood that, contrary to the baseband where destructive I/Q interference may occur, waveguide dispersion may be seen "as is" by IF frequencies in situations where the IF LO frequency is larger than the baseband bandwidth. Moreover, because the amplitude response of the waveguide 145 may be considered to be nearly flat, ideally little-to-no amplitude equalization may be required once dispersion is compensated. Because of this, the channel may be equalized with a single two-port analog circuit.

Figure 2:
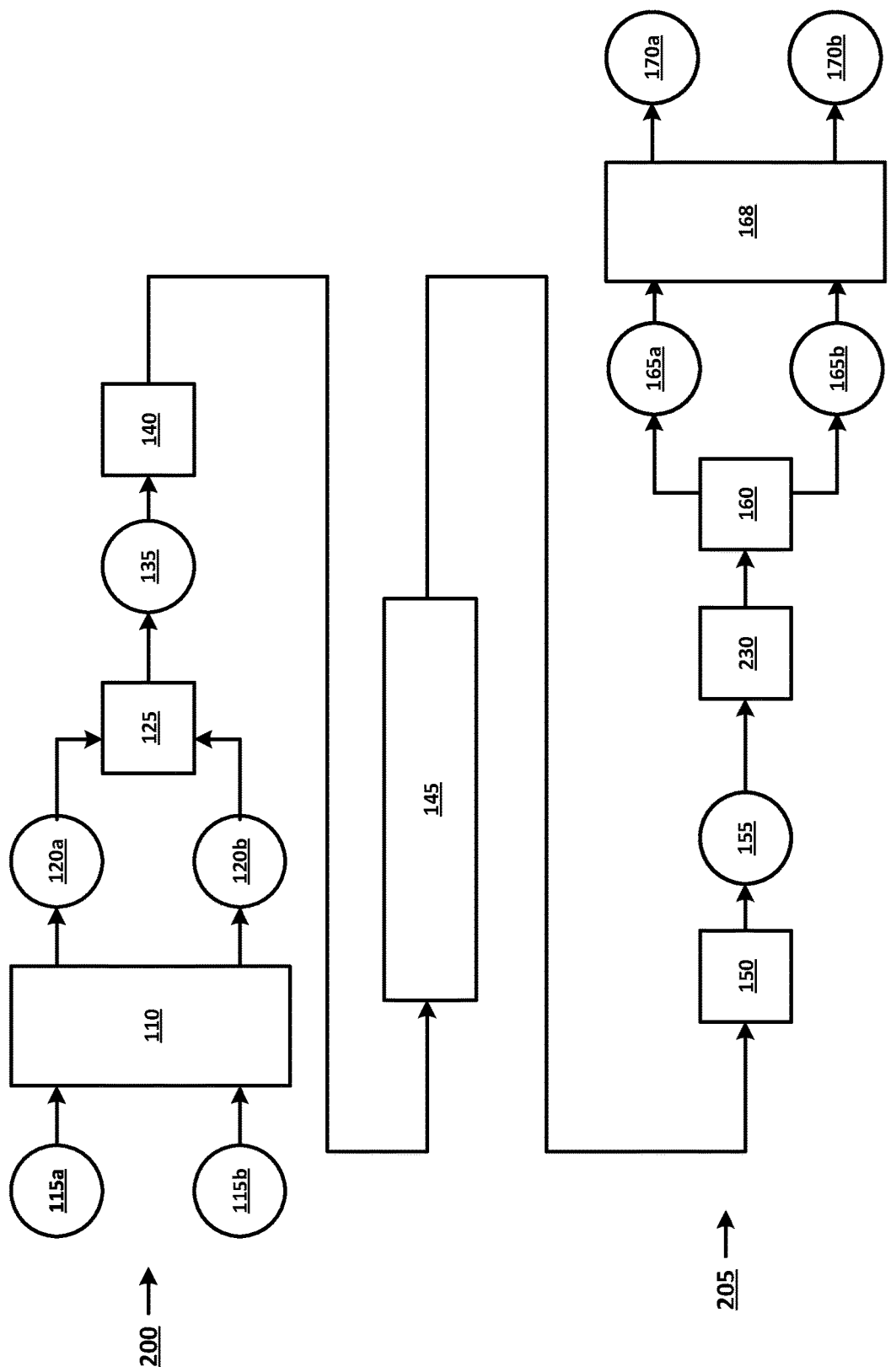
FIG. 2 depicts an alternative example architecture that includes dispersion compensation, in accordance with various embodiments.
Figure 3:
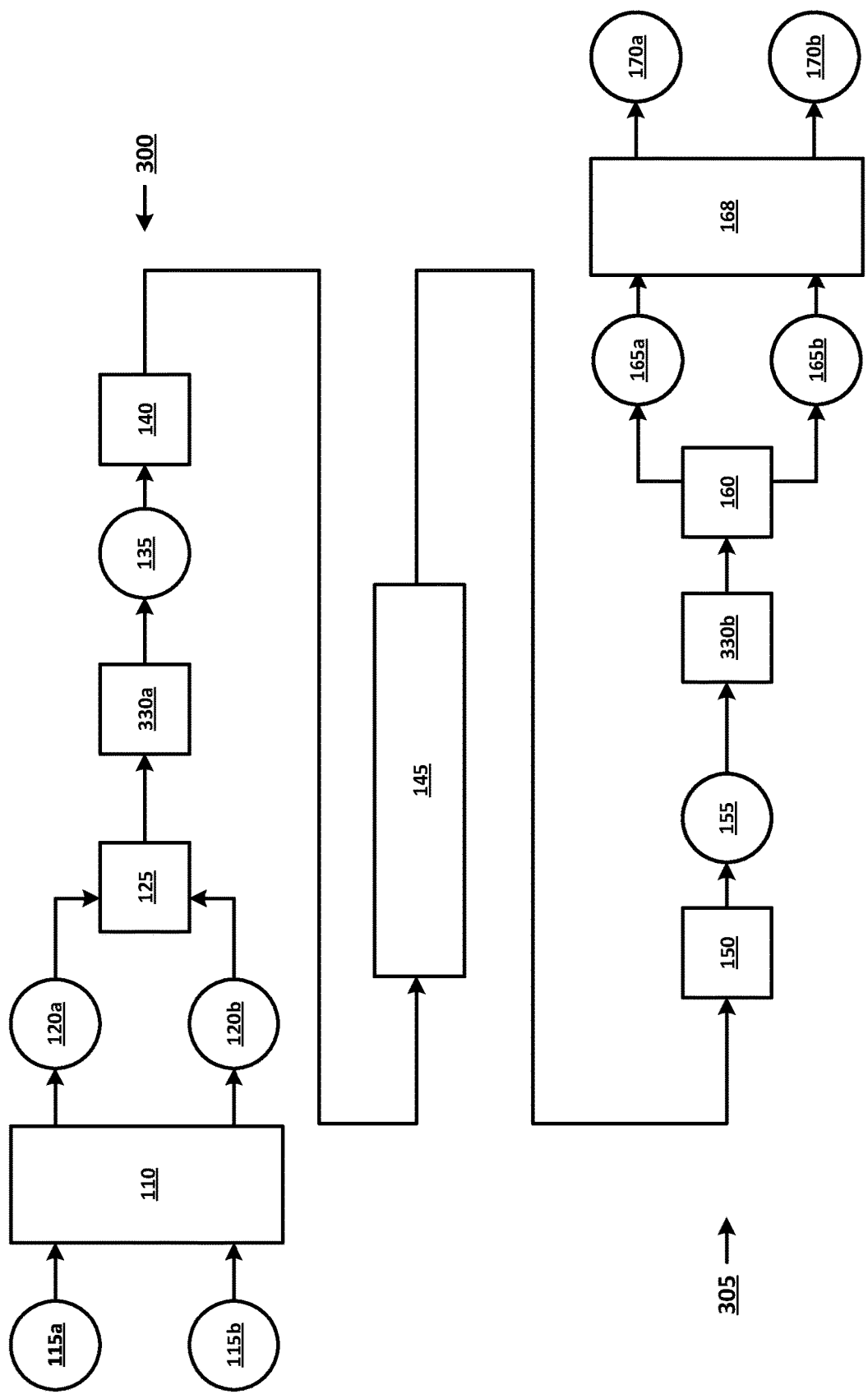
FIG. 3 depicts an alternative example architecture that includes dispersion compensation, in accordance with various embodiments.
Figure 4:
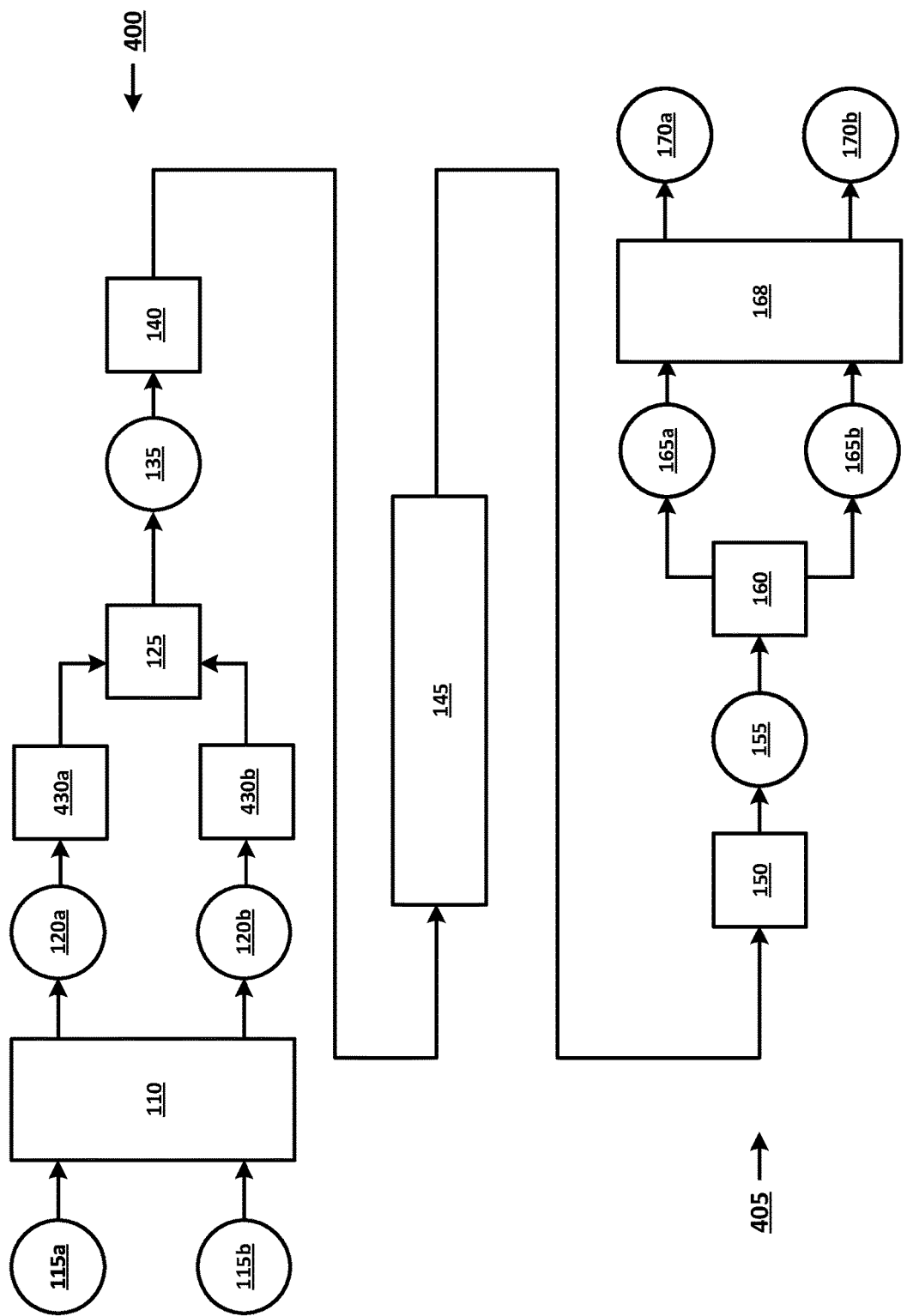
FIG. 4 depicts an alternative example architecture that includes dispersion compensation, in accordance with various embodiments.

FIGS. 2-4 depict alternative example architectures which may include DC, in accordance with various embodiments. Generally, each of the architectures may include elements similar to those of the architecture of FIG. 1. However, in various of the architectures, the DC may be located in a different portion of the signal path between the baseband modules 110/168. For example, FIG. 2 may include transmit and receive modules 200 and 205, which may be respectively similar to transmit and receive modules 100 and 105. However, as may be seen, rather than placing the DC module in the signal path of the transmit module 200, the DC module 230 (which may be similar to DC module 130) may be placed in the signal path of the receive module 205. Specifically, the DC module 230 may be positioned between mixer 155 and splitter 160, as shown in FIG. 2.

Similarly, FIG. 3 depicts an architecture that includes transmit and receive modules 300 and 305, which may be respectively similar to transmit and receive modules 100 and 105. However, as may be seen, the DC module may be in the signal path of both the transmit module 300 and the receive module 305. Specifically, as may be seen, a first DC module 330a (which may be similar to DC module 130) may be positioned in the signal path of the transmit module 300 between the combiner 125 and the mixer 135. Additionally, a second DC module 330b (which may also be similar to DC module 130) may be positioned in the signal path of the receive module 305 between the mixer 155 and the splitter 160.

Similarly, FIG. 4 depicts an architecture that includes transmit and receive modules 400 and 405, which may be respectively similar to transmit and receive modules 100 and 105. However, transmit module 400 may include two separate DC modules 430a and 430b, which may be respectively similar to DC module 130. As may be seen, the DC modules 430a and 430b may be in the signal paths of the first and second data signals. That is, DC module 430a may be positioned between mixer 120a and combiner 125, and DC module 430b may be positioned between mixer 120b and combiner 125.

Generally, it will be understood that FIGS. 1-4 are intended as example architectures, and other embodiments may vary. For example, some embodiments may include a combination of a transmit module such as transmit module 400 with a receive module such as receive module 200. In some embodiments, DC modules may be positioned between splitter 160 and mixers 165a/165b. In some embodiments, a single DC module may span both of the signal paths between mixers 120a/120b and splitter 125. Other embodiments may include other variations.

Figure 5:
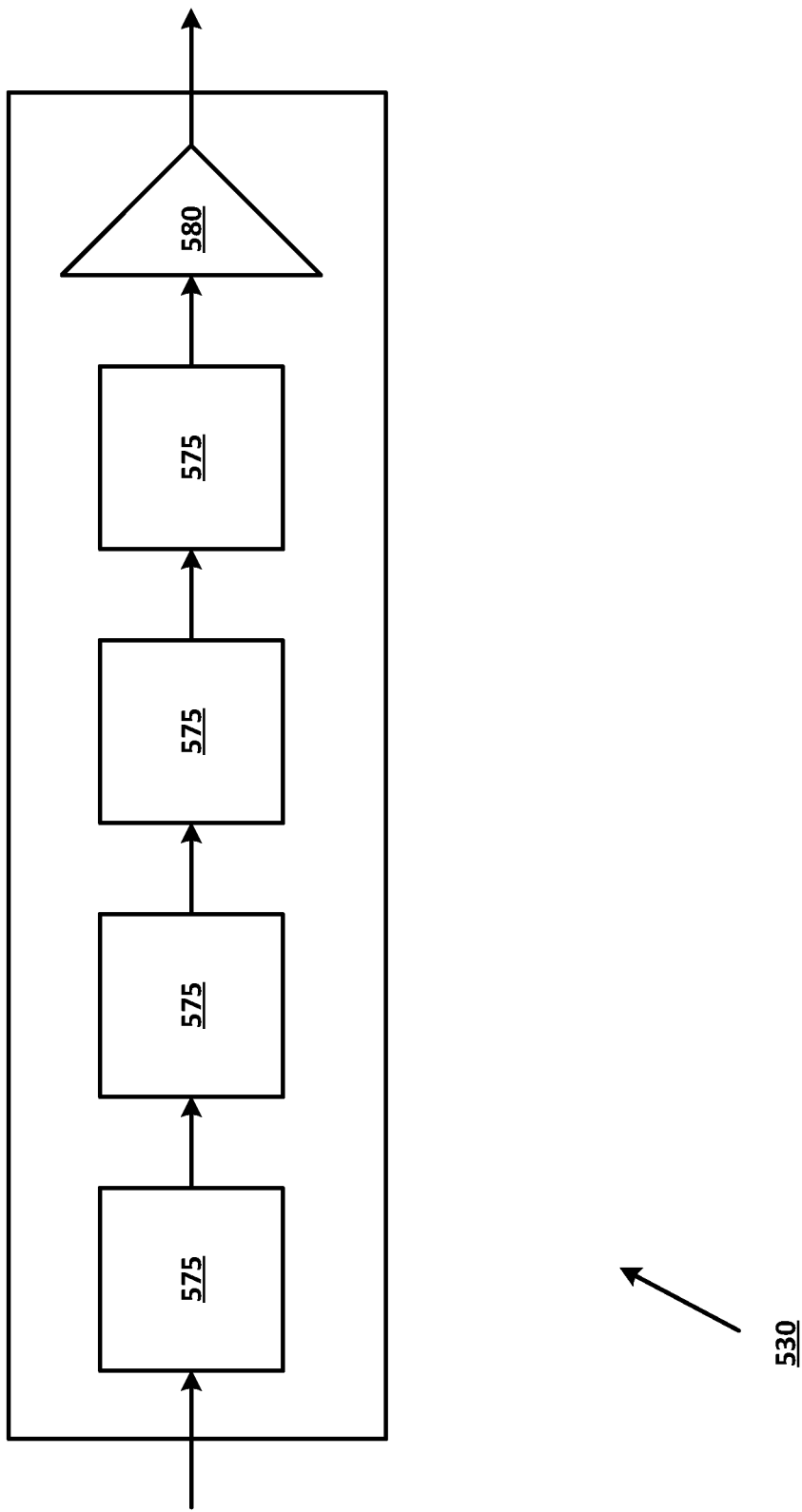
FIG. 5 depicts an example dispersion compensation module, in accordance with various embodiments.

FIG. 5 depicts an example DC module 530, in accordance with various embodiments. The DC module 530 may be similar to, for example, DC module 130 described above. Generally, the DC module 530 may include a plurality of filters such as APFs 575. Although only 4 APFs 575 are depicted in FIG. 5, in other embodiments a DC module 530 may have more or fewer APFs. The connections of the APFs 575 may be referred to as "cascaded" or "serially-coupled." In some embodiments, the DC module 530 may further include a gain equalizer 580, which may reduce or eliminate insertion loss in the APFs 575 due to finite quality factor or process variations. However, in other embodiments the gain equalizer 580 may not be present.

Figure 6:
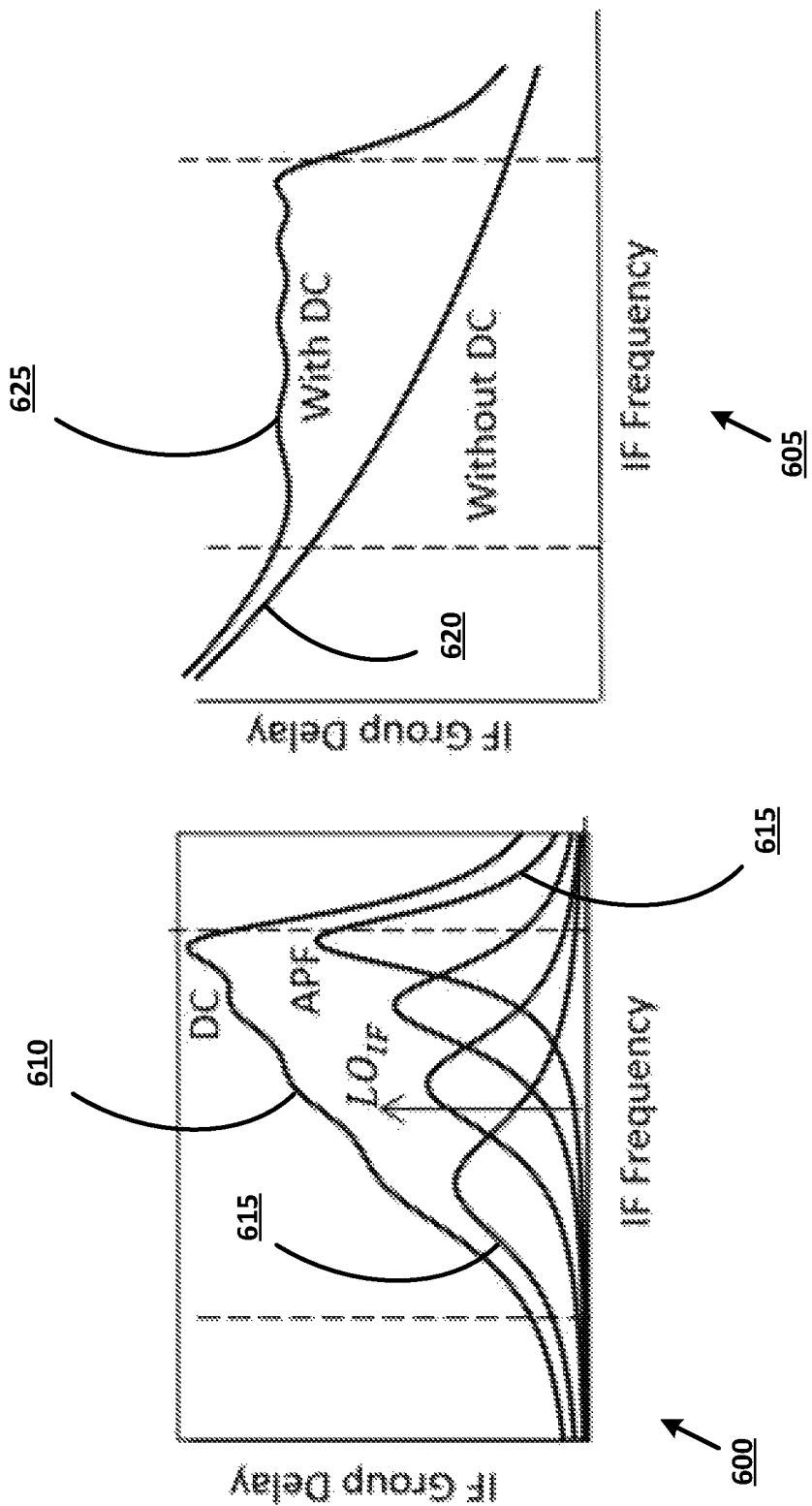
FIG. 6 depicts examples of group-delay in an architecture that includes dispersion compensation, in accordance with various embodiments.

Typically, APFs may have a unitary amplitude response for almost all frequencies, and a group-delay response which may be specified, within certain constraints given by the filter order. FIG. 6 may depict how a cascade of second-order APFs, whose individual group-delay response shows a resonant peak at the design frequency, may be used to implement arbitrary dispersion-frequency curves. Specifically, FIG. 6 may depict an example at 600 of group-delay using a number of individual APFs. Specifically, in the example 600, a number of group-delay response curves 615 may be shown, which may correspond to individual ones of the APFs 575. The example 600 may further depict an overall group-delay curve 610 for an entire DC module such as DC module 530.

FIG. 6 may further depict an example 605 that depicts the total group-delay of an architecture such as the architecture of FIG. 1. Curve 620 may depict the group-delay without the presence of a DC module such as DC module 530, and curve 625 may depict the group-delay with the presence of a DC module such as DC module 625. As may be seen, the dashed vertical lines in examples 600 and 605 may represent the bandwidth of operation for the architecture, which may be significantly increased with the presence of the DC module as may be seen by comparing lines 620 and 625. Specifically, as may be seen at 620, in legacy embodiments the group-delay of the waveguide may decrease with a change in frequency (i.e., increasing or decreasing frequency). However, as may be seen at 625, embodiments may equalize, over a finite bandwidth delimited by the dashed lines in examples 600/605 the group-delay.

To achieve this equalization, the staggered peaks of the lines at 615 may be designed to have larger peak delay with increasing frequency, resulting in the total DC group-delay depicted at 610. Additionally, as may be seen at example 605, the overall group-delay may be seen as generally independent of frequency, which may help prevent dispersion-induced ISI, transmission nulls, or I/Q crosstalk when down-conversion of the frequency to the baseband frequency occurs (e.g., by mixers 165a/165b). It will be understood that, although second-order APFs are discussed herein, embodiments may be extended to APFs with a higher or lower order, whether used as a cascadable block in a DC module such as DC module 530, or as a DC of their own. More generally, in some embodiments, respective ones of the APFs 575 of the DC module 530 may be of a different order than another of the APFs 575.

Additionally, it will be noted that embodiments or concepts herein may be applied to architectures that include waveguides with either normal (where group-delay increases with frequency) or anomalous (where group-delay decreases with frequency) dispersion. Generally, the amount of APFs with a DC module, or number of DC modules themselves, may be based on the amount of dispersion that is to be compensated for. Generally, embodiments may allow for modularity and reusability, and may be modulation-agnostic such that the design of the DC modules may be similar for different modulation schemes such as QPSK, QAM16, QAM64, etc.

APFs such as APFs 575 may be implemented in a variety of designs. For example, one or more of the APFs 575 may be a passive lumped circuit, an active lumped circuit, a distributed structure, etc. In some embodiments, the APFs 575 may be implemented as a circuit that includes a number of resistors, capacitors, transistors, etc. In some embodiments, one or more of the elements of the circuit may be tunable, that is, the resistance/capacitance/etc. may be variable and set by other control circuitry of the transmit or receive modules, or the electronic device of which the transmit or receive modules are a part. In some embodiments, the control circuitry may be configured to turn on, or off, certain of the APFs within a DC module so that the overall group-delay of the DC module may be changed dynamically based on characteristics of the overall architecture or the waveguide. In some embodiments, the control circuit may dynamically (i.e., on-the-fly) evaluate the received signal quality and accordingly adapt/control/tune APFs of DC modules of the transmit module or receive module.

In some embodiments, circuitry or parameters of various of the APFs may be mapped to group-delay peaks such as those depicted at 615 in FIG. 6, relating peak frequency or height to physical parameters of the circuitry of the APFs. The structures related to the APFs may then be designed as part of the transmit or receive modules of which they are a part. In some embodiments, the structures may be designed to operate at the mmWave frequency or above, however such operation may incur high insertion loss because loss may scale linearly with frequency for a specified group-delay.

Figure 7:
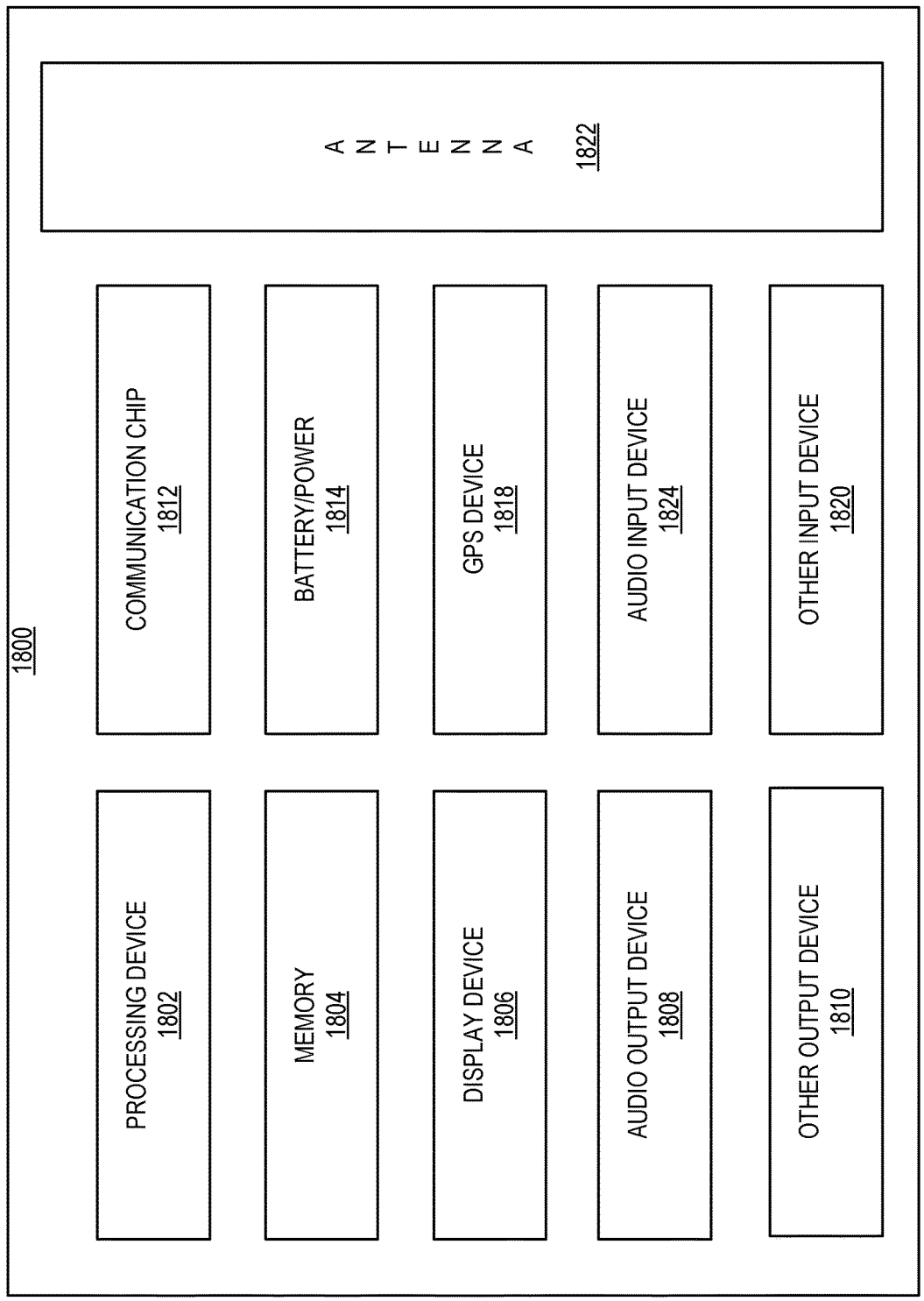
FIG. 7 is a block diagram of an example electrical device that may include dispersion compensation in accordance with various embodiments.

FIG. 7 is a block diagram of an example electrical device 1800 that may include one or more DC modules, in accordance with any of the embodiments disclosed herein. A number of components are illustrated in FIG. 7 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single system-on-a-chip (SoC) die.

Additionally, in various embodiments, the electrical device 1800 may not include one or more of the components illustrated in FIG. 7, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), ASICs, CPUs, GPUs, cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random-access memory (eDRAM) or spin transfer torque magnetic random-access memory (STT-MRAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute of Electrical and Electronics Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications. In some embodiments, the communication chip 1812 may include, or be communicatively coupled with, a transmit or receive module such as those discussed herein.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include another output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include another input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 1800 may be any other electronic device that processes data.

EXAMPLES OF VARIOUS EMBODIMENTS

Example 1 includes a communications module comprising: a baseband module to process a first data signal with a first frequency; a RF module to facilitate communication of an electromagnetic signal at a second frequency, wherein the electromagnetic signal is related to the data signal; and a dispersion compensation module communicatively coupled between the baseband module and the RF module, wherein the dispersion compensation module is to process a data signal at an intermediate frequency that is between the first frequency and the second frequency.

Example 2 includes the communications module of example 1, wherein the dispersion compensation module includes an allpass filter.

Example 3 includes the communications module of example 1, wherein the dispersion compensation module includes a plurality of serially-coupled allpass filters.

Example 4 includes the communications module of example 1, wherein the dispersion compensation module includes a gain equalizer.

Example 5 includes the communications module of any of examples 1-4, wherein the baseband module is to process the first data signal and a second data signal in parallel with the first data signal.

Example 6 includes the communications module of example 5, wherein the data signal at the intermediate frequency is based on the first and second data signals.

Example 7 includes the communications module of example 5, wherein the dispersion compensation module is communicatively coupled between the baseband module and the combiner.

Example 8 includes the communications module of any of examples 1-4, wherein the electromagnetic signal is a millimeter-wave (mmWave) signal.

Example 9 includes an electronic device comprising: an active element to process a data signal; and a communications module coupled with the active element, wherein the communications module includes: a baseband module to process a first data signal with a baseband frequency and a second data signal with the baseband frequency; a RF module to facilitate communication of an electromagnetic signal at a second frequency, wherein the electromagnetic signal is based on a combination of the first data signal and the second data signal; and a dispersion compensation module communicatively coupled between the baseband module and the RF module, wherein the dispersion compensation module is to process a data signal at an intermediate frequency that is between the baseband frequency and the second frequency.

Example 10 includes the electronic device of example 9, wherein the communications module is a transmit module, and wherein the RF module is to facilitate transmission of the electromagnetic signal along a waveguide.

Example 11 includes the electronic device of example 9, wherein the communications module is a receive module, and wherein the RF module is to facilitate reception of the electromagnetic signal from a waveguide.

Example 12 includes the electronic device of any of examples 9-11, wherein the electromagnetic signal has a frequency of at least 30 gigahertz (GHz).

Example 13 includes the electronic device of any of examples 9-11, wherein the electromagnetic signal has a frequency of at least 300 gigahertz (GHz).

Example 14 includes the electronic device of any of examples 9-11, wherein the electromagnetic signal has a frequency of at least 1 terahertz (THz).

Example 15 includes a dispersion compensation module comprising: a first allpass filter with a first group-delay response related to a first dispersion characteristic of a communication channel between a baseband module and a RF module of a communications module; and a second allpass filter with a second group-delay response related to a second dispersion characteristic of the communication channel.

Example 16 includes the dispersion compensation module of example 15, wherein the baseband module is to process a data signal with a baseband frequency, and the RF module is to process an electromagnetic signal with a frequency greater than 30 gigahertz (GHz).

Example 17 includes the dispersion compensation module of example 16, wherein the dispersion compensation module is to process an intermediate signal that is related to the data signal and the electromagnetic signal, and wherein the intermediate signal has a frequency between the baseband frequency and a frequency of the electromagnetic signal.

Example 18 includes the dispersion compensation module of example 16, wherein the electromagnetic signal has a frequency greater than 300 GHz.

Example 19 includes the dispersion compensation module of any of examples 15-18, wherein the dispersion compensation module further includes a gain equalizer.

Example 20 includes the dispersion compensation module of any of examples 15-18, wherein the first and second allpass filters are serially-coupled with one another.

Example 21 includes the dispersion compensation module of any of examples 15-18, wherein a characteristic of the first allpass filter is variable based on a characteristic of the communication channel.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A communications module comprising:
a baseband module to process a first data signal with a first frequency;
a radio frequency (RF) module to facilitate communication of an electromagnetic signal at a second frequency, wherein the electromagnetic signal is related to the first data signal, and the second frequency is higher than the first frequency; and
a dispersion compensation module communicatively coupled between the baseband module and the RF module, wherein the dispersion compensation module is to process [[a]] the first data signal at an intermediate frequency that is between higher than the first frequency and lower than the second frequency.

2. The communications module of claim 1, wherein the dispersion compensation module includes an allpass filter.

3. The communications module of claim 1, wherein the dispersion compensation module includes a plurality of serially-coupled allpass filters.

4. The communications module of claim 1, wherein the dispersion compensation module includes a gain equalizer.

5. The communications module of claim 1, wherein the baseband module is to process the first data signal and a second data signal in parallel with the first data signal.

6. The communications module of claim 5, wherein the dispersion compensation module is to process a third data signal at the intermediate frequency, wherein the third data signal is based on the first and second data signals.

7. The communications module of claim 5, wherein the dispersion compensation module is communicatively coupled between the baseband module and a combiner.

8. The communications module of claim 1, wherein the electromagnetic signal is a millimeter-wave (mmWave) signal.

9. An electronic device comprising:
an active element to process a data signal; and
a communications module coupled with the active element, wherein the communications module includes:
a baseband module to process a first data signal with a baseband frequency and a second data signal with the baseband frequency;
a radio frequency (RF) module to facilitate communication of an electromagnetic signal at a second frequency, wherein the electromagnetic signal is based on a combination of the first data signal and the second data signal; and
a dispersion compensation module communicatively coupled between the baseband module and the RF module, wherein the dispersion compensation module is to process a data signal at an intermediate frequency that is higher than the baseband frequency and lower than the second frequency.

10. The electronic device of claim 9, wherein the communications module is a transmit module, and wherein the RF module is to facilitate transmission of the electromagnetic signal along a waveguide.

11. The electronic device of claim 9, wherein the communications module is a receive module, and wherein the RF module is to facilitate reception of the electromagnetic signal from a waveguide.

12. The electronic device of claim 9, wherein the electromagnetic signal has a frequency of at least 30 gigahertz (GHz).

13. The electronic device of claim 9, wherein the electromagnetic signal has a frequency of at least 300 gigahertz (GHz).

14. The electronic device of claim 9, wherein the electromagnetic signal has a frequency of at least 1 terahertz (THz).

15. A dispersion compensation module comprising:
a first allpass filter with a first group-delay response related to a first dispersion characteristic of a communication channel between a baseband module and a radio frequency (RF) module of a communications module; and
a second allpass filter with a second group-delay response related to a second dispersion characteristic of the communication channel.

16. The dispersion compensation module of claim 15, wherein the baseband module is to process a data signal with a baseband frequency, and the RF module is to process an electromagnetic signal with a frequency greater than 30 gigahertz (GHz).

17. The dispersion compensation module of claim 16, wherein the dispersion compensation module is to process an intermediate signal that is related to the data signal and the electromagnetic signal, and wherein the intermediate signal has a frequency between the baseband frequency and a frequency of the electromagnetic signal.

18. The dispersion compensation module of claim 15, wherein the dispersion compensation module further includes a gain equalizer.

19. The dispersion compensation module of claim 15, wherein the first and second allpass filters are serially-coupled with one another.

20. The dispersion compensation module of claim 15, wherein a characteristic of the first allpass filter is variable based on a characteristic of the communication channel.

* * * * *